United States Patent
Niwa et al.

[11] Patent Number: 5,882,012
[45] Date of Patent: Mar. 16, 1999

[54] OIL SEAL RING

[75] Inventors: Hiroshi Niwa, Kuwana; Kazunori Kubota, Iwata; Eiichiro Shimazu, Inabe-gun, all of Japan

[73] Assignee: NTN Corporation, Osaka, Japan

[21] Appl. No.: 757,305

[22] Filed: Nov. 27, 1996

[30] Foreign Application Priority Data

Nov. 30, 1995 [JP] Japan ................................. 7-313004

[51] Int. Cl.⁶ .................... F16J 9/28; F16J 15/50
[52] U.S. Cl. .................. 277/407; 277/935; 277/936; 277/938; 277/946
[58] Field of Search ................ 428/64.1; 277/401, 277/404, 407, 408, 579, 582, 590, 935, 936, 938, 944, 945, 946

[56] References Cited

U.S. PATENT DOCUMENTS

| | | | |
|---|---|---|---|
| 3,919,448 | 11/1975 | Dufresne | 428/157 |
| 4,098,515 | 7/1978 | Sakata | 277/406 |
| 5,124,397 | 6/1992 | Kanazawa et al. | 524/496 |
| 5,628,519 | 5/1997 | Kakehi | 277/216 |
| 5,733,995 | 3/1998 | Kimura et al. | 528/15 |

*Primary Examiner*—Robert H. Harrison
*Attorney, Agent, or Firm*—Nikaido, Marmelstein, Murray & Oram LLP

[57] ABSTRACT

An oil-submerged sliding member which has a good sealability and wear resistance and low attack to the mating member and which can be used with either a soft or a non-soft mating member. It is made from a resin composition comprising 30–88% by weight of a crosslinked polyallylene sulfide resin having a melt viscosity of 2000–5000 poise at 300° C., 10–45% by weight of a carbon fiber, and 2–25% by weight of recycled polytetrafluoroethylene resin powder, and if required, not more than 10% by weight of molybdenum disulfide. Also, oil seal rings comprising the oil-submerged sliding member.

13 Claims, 13 Drawing Sheets

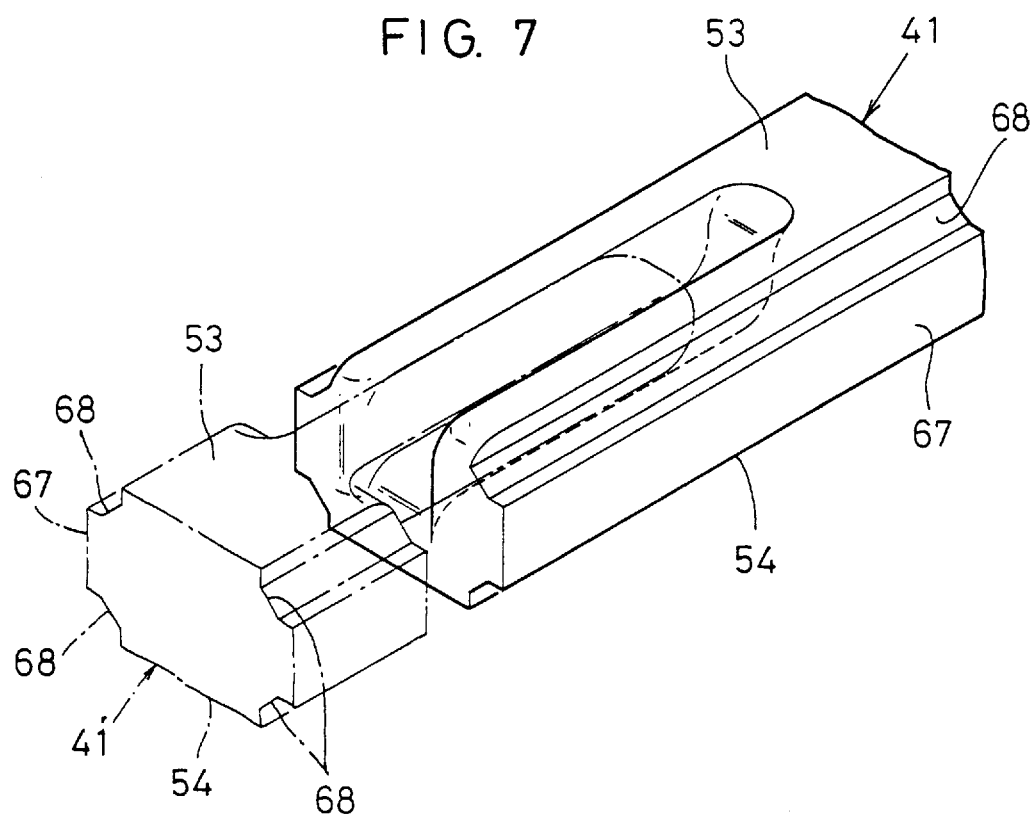

OIL SEAL RING

BACKGROUND OF THE INVENTION

This invention relates to oil-submerged sliding members used in oil, and particularly to oil seal rings formed from the oil-submerged sliding members.

Automatic transmissions for automobiles such as torque converters and hydraulic clutches have oil seal rings at necessary locations to seal hydraulic oil therein. Such oil seal rings are rotatably mounted between a rotary shaft and a cylinder while kept in sliding contact therewith. It is therefore required that such oil seal rings have a low friction coefficient, high wear resistance, a low tendency to damage a cylinder (mating member) to be brought into sliding contact, good oil sealing properties and other properties. Conventional oil seal rings of this type were made of cast iron. Efforts have been made to develop materials for seal rings which can prevent oil leakage even if used in today's compact, lightweight, high-performance hydraulic devices. Now, an increasingly large number of oil rings are made of tetrafluoroethylene resin, a material which is superior in sealing and sliding properties to cast iron.

Cast-iron oil seal rings are high in wear resistance and less likely to abrade a ferrous mating member, but poor in sealing properties. On the other hand, tetrafluoroethylene rings, superior in sealing properties, tend to wear out quickly as the PV value increases.

In Unexamined Japanese Patent Publications 55-7848, 2-175793 and 7-179846, various oil seal rings that have good sealability are disclosed.

The oil seal rings disclosed in these publications are all intended for use with mating members made of soft materials such as aluminum alloy. If such seal rings are used with a non-soft ferrous mating member, the mating member may abrade the seal rings, causing oil leakage, though the mating members are abraded little.

An object of this invention is to provide an oil seal ring which is made from a material which is injection-moldable and thus advantageous for mass-production, and which can be used with either a soft or a non-soft mating member.

SUMMARY OF THE INVENTION

According to this invention, there is provided an oil-submerged sliding member made from a resin composition comprising 30–88% by weight of a polyallylene sulfide resin, 10–45% by weight of a carbon fiber, and 2–25% by weight of a perfluororesin.

The oil-submerged sliding member made from the above-mentioned resin composition is high in wear resistance, less likely to abrade mating members, and has superior sealing properties.

Other features and objects of the present invention will become apparent from the following description made with reference to the accompanying drawings, in which:

BRIEF DESCRIPTION OF THE DRAWINGS

FIG. 7 is a partial perspective view of a seal ring similar to the seal ring shown in FIG. 6A but having grooves;

DETAILED DESCRIPTION OF THE PREFERRED EMBODIMENT

Figure 1:
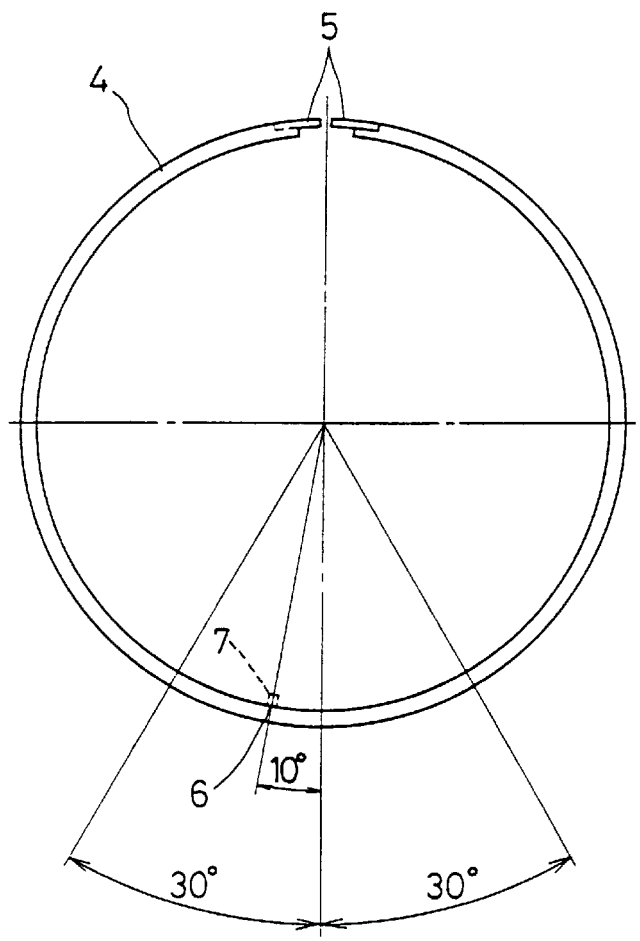
FIG. 1 is a front view of an oil seal ring according to this invention.

The crosslinked polyallylene sulfide resin (hereinafter referred to as PAS resin) is a synthetic resin represented by Formula 1.

Formula 1

(wherein n is an integer)

Ph in Formula 1 may be one of those represented by Formulas 2–7.

Formula 2

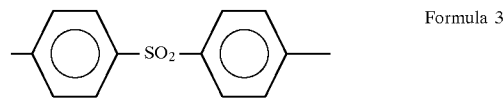

Formula 3

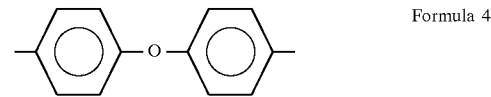

Formula 4

Formula 5

(wherein Q is a halogen or $CH_3$ of F, Cl or Br and m is an integer, 1, 2, 3 or 4.)

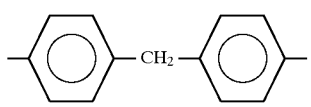

Formula 6

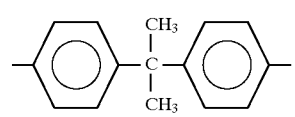

Formula 7

PAS resin should preferably contain repeating units represented by Formula 1 by 70 mole % or over, more preferably 90 mole % or over. If the content of repeating units is less than 70 mole %, the composition obtained will not reveal expected properties.

Such a polymer may be prepared by any known method, such as by reacting sodium sulfide and p-dichlorobenzene in an amide solvent such as N-methylpyrrolidone or dimethylacetamide or a sulfone solvent such as sulfolane. The polymer may further contain less than 30 mole %, preferably 1–10 mole %, of copolymers represented by Formulas 8–12, provided they do not affect the crystallizability of the polymer.

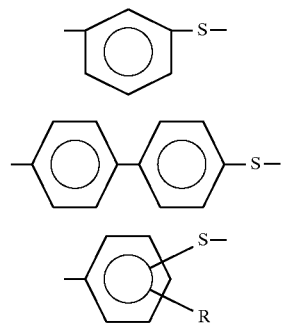

Formula 8

Formula 9

Formula 10

(wherein R is an alkyl group except methyl group, nitro group, phenyl group or alkoxy group.)

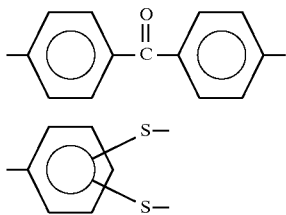

Formula 11

Formula 12

Such PAS resins are synthesized by reacting a halogen-substituted aromatic compound with alkali sulfide as disclosed in Examined Japanese Patent Publications 44-27671 and 45-3368, by subjecting an aromatic compound to condensation reaction with sulfur chloride in the presence of Lewis acid catalyst as disclosed in Examined Japanese Patent Publication 46-27255, or by subjecting a thiophenol to condensation reaction in the presence of an alkaline catalyst or copper salt as disclosed in U.S. Pat. No. 3,274,165. Any one may be selected.

As the PAS resin, a crosslinked or semi-crosslinked (semi-linear) resin should preferably be used, because a crosslinked or semi-crosslinked PAS resin has a higher wear resistance than a linear PAS resin. Further, a crosslinked or semi-crosslinked PAS resin is less likely to produce burrs during injection molding than a linear PAS resin.

A crosslinked or semi-crosslinked PAS resin is manufactured by polymerizing a polymer low in the degree of polymerization and then heating it in the presence of air or adding a crosslinking or branching agent.

The thus crosslinked PAS resin should have a melt viscosity of 1000–5000 poise, preferably 2000–4000 poise. If it is less than 1000 poise, the resin's mechanical properties such as creep resistance at temperatures higher than 150° C. will deteriorate, making the PAS resin more easily deformable. If higher than 5000 poise, formability an flexibility will deteriorate, making it difficult to mount a seal ring formed from such a resin in a piston groove. The melt viscosity is measured by means of a Koka type flow tester at a measuring temperature of 300° C., using an orifice 1 mm in diameter and 10 mm long, under a measuring load of 20 kg/cm$^2$, with a preheating time set at six minutes.

Also, as the thermal stability of the crosslinked PAS resin, the change of its melt viscosity when the resin is preheated six minutes and 30 minutes is measured under the same conditions as mentioned above. Such change of rate is preferably within the range of from −50% to 150%. The rate of change is given by the following formula:

$$\text{change of rate} = (P30 - P4)/P4 \times 100$$

(wherein P4 is value when the resin was heated six minutes, and P30 is value at thirty-minute heating)

Partially crosslinked PPS resins that satisfy these requirements include T4, T4AG and TX-007 made by Tohpren.

The PAS resin should preferably have a weight-average molecular weight of 20000–45000, more preferably 25000–40000. If less than 20000, its heat resistance will be insufficient. If over 45000, formability will deteriorate, making it difficult to form an end product with high dimensional accuracy especially if the end product has a complicated shape.

The content of PAS resin should be 30–88% by weight with respect to the entire resin composition. If less than 30% by weight, the oil-submerged sliding member formed from this resin composition will be insufficiently low in strength. If higher than 88% by weight, even the addition of predetermined fillers will not reinforce the resin composition sufficiently. An oil-submerged sliding member made from such a resin composition tends to be low in wear resistance.

The carbon fiber used in this invention is not limited as far as it can withstand temperatures of 1000° C. and over, preferably 1200°–1500° C., and may be any of rayon, polyacryronitrile, lignin-poval mixture, special pitch fibers. Also, it may be a long or short single fiber or in the form of woven fabric, nonwoven fabric, thread or rope such as cloth, felt, paper, yarn, etc.

The carbon fiber may be made of any material such as pitch, PAN or carbon. Fibers about 4–20 μm in diameter and 10–1000 μm long, more preferably 10–500 μm, are especially desirable because such fibers can reinforce the resin composition sufficiently by dispersing uniformly in the resin composition.

Taking further into consideration the resilience, the mechanical strength of the resin composition such as tensile strength, tendency to attack mating members such as a cylinder and piston, and flowability of the resin composition during forming, the carbon fiber should preferably have an average diameter of about 5–14 μm and an average length of about 10–500 μm.

The carbon fiber used in this invention preferably has an average diameter not less than 10 μm, because such thick fiber is high in wear resistance.

The carbon fiber may be manufactured by calcining one of various kinds of organic, high-molecular fibers to an average temperature of 1000°–3000° C. The carbon fiber thus manufactured is mainly constructed of net or lattice plane of carbon atoms. Carbon fibers having net plane substantially parallel to the fiber axis include highly orientated, anisotropic PAN fibers and pitch fibers. Carbon fibers having their net plane aggregated in a disorderly manner include isotropic pitch fibers.

Highly orientated, anisotropic carbon fibers show high resilience and tensile strength in a specific direction, whereas isotropic carbon fibers can withstand loads from every direction fairly well.

Carbon fibers made from different materials may have different average diameters. For example, it is impossible to manufacture fibers having an average diameter of 10 μm or more from a PAN carbon fiber. Such thick fibers have to be formed from a pitch carbon fiber.

Pitch carbon fiber is considerably lower in mechanical strength than PAN carbon fiber. For example, the pitch carbon fiber has only 590–980 MPa in tensile strength, compared with 2400 MPa for PAN carbon fiber, and 30–40 GPa in tensile modulus, compared with 340 GPa for PAN carbon fiber. But the use of such pitch fiber in the oil seal ring according to the present invention will pose no problem. A small amount of PAN fiber may be mixed in the fiber used in the seal ring of the present invention. Not all the fibers used have to have an average diameter of 10 μm or more. Rather, by adding fibers having an average diameter of less than 10 mm, it is possible to increase the wear resistance and reduce the possibility of breakage of the seal ring when mounting on the mating member. But the amount of such fibers should not exceed 30% of the entire fibers.

Such carbon fibers should be 10–1000 μm long, preferably 10–500 μm long so that they can sufficiently reinforce the resin composition by uniformly dispersing therein.

Pitch carbon fibers are classified into structurally amorphous, isotropic fibers such as petroleum pitch, which is a by-product during petroleum refining, and fibers having an orientated structure such as optically anisotropic fibers.

Isotropic pitch carbon fibers are in turn classified into petroleum fibers, coal fibers, synthetic fibers, liquefied coal fibers, etc. These materials are formed into pitch fibers by melt spinning. The fibers thus formed are subjected to infusible treatment and then carbonized.

Liquid crystal pitch carbon fibers are manufactured e.g. by heating a pitch in an inert gas phase to 350°–500° C. to liquid-crystallize it, hardening it into cokes, melt-spinning the cokes thus produced, heating them in an oxidizing atmosphere to provide insoluble, infusible oxidized fibers, and heating them to about 1000° C. or higher in an inert gas phase.

From among such fibers, one may select fiber having a relatively low tensile modulus of 30–50 GPa or fiber having a medium to high tensile modulus of about 240–500 GPa, according to the intended use. Fibers having excellent mechanical properties such as tensile strength may be further added to the resin composition to improve the mechanical strength of a seal member formed from the resin composition.

Pitch carbon fibers include KUREKA M207S (fiber diameter 12–13 μm), KUREKA CHOP M201F (average fiber diameter: 12.5 μm, average fiber length: 0.13 mm), M201S (average fiber diameter: 14.5 μm, average fiber length: 0.13 mm), and M107T (average fiber diameter; 18.0 μm, average fiber length: 0.70 mm), all made by Kureha Chemical.

PAN carbon fibers can be manufactured by heating and burning acrylic fibers such as polyacrylonitrile fiber. By controlling the heating temperature, it is possible to adjust the tensile modulus to a desired level. For example, if the fiber is heated to about 1000°–1500° C., its tensile modulus will be 200–30 GPa on the average with the tensile strength being 300–6000 MPa. If heated to about 2000° C., the fiber will have an average tensile modulus of 350–500 GPa. The tensile strength is preferably controlled to 400–500 GPa on the average.

Thus, because the PAN carbon fibers are fibers having high tensile strength, it is possible to adjust the tensile strength to 500–6000 MPa or 500–3000 MPa on average by controlling the heating temperature. If the tensile strength is too low, it will be impossible to improve the resistance to compressive creep of the resin composition. If too high, mating members such as a piston and cylinder may be attacked by the resin composition. "BESFIGHT" (trade name) series fibers made by Toho Rayon Co., Ltd. are examples of such PAN carbon fibers. In the "BESFIGHT" series are include HTA-CMF-0040-E, HTA-CMF-0160-E, HTA-CMF-1000-E, HTA-C6-E (fiber length: 6 mm for all). Such PAN carbon fibers also include "TORAYCA" (trade name) series fibers made by Toray, such as MLD-300, MLD-1000.

Such carbon fibers should preferably have tensile strength of 550–1000 MPa and Vickers hardness (Hv) of 400–600. If the tensile strength is less than 550 MPa and/or the Vickers hardness (Hv) is less than 400, the addition of carbon fibers will not serve to reinforce the resin composition. If the tensile strength is greater than 1000 MPa and/or the Vickers hardness (Hv) is higher than 600, the resin composition may attack or abrade the mating members.

Such carbon fibers are resistant to chemicals such as acids and alkalis and wear-resistant too.

In order to improve adhesion between such carbon fiber and the aforementioned PAS fiber and thus to improve mechanical properties of the oil-submerged sliding member, the surface of the carbon fiber may be treated with a treating agent containing epoxy resin, polyamide resin, polycarbonate resin or polyacetal resin or a silane coupling agent.

Carbon fibers having a tensile strength of 550–1000 MPa and a tensile modulus of 30–50 GPa are especially desirable. If the tensile strength and/or tensile modulus is less than the lower limit, the carbon fibers will not reinforce the resin composition. If over the upper limit, the wear resistance of the resin composition will be insufficient.

The content of carbon fiber in the resin composition should be 10–45% by weight, preferably 10–30% by weight. If less than 10% by weight, the carbon fiber can scarcely improve the wear resistance of the oil-submerged sliding member. Addition of more than 45% by weight of carbon fiber would markedly impair the melt-flow characteristics of the resin composition, and thus its moldability.

The perfluororesin used in this invention may be one of fluororesins represented by polytetrafluoroethylene (PTFE). This resin comprises a skeleton of carbon atoms completely surrounded by fluorine atoms and a trace amount of oxygen atoms. Due to the strong C—F bonds, its heat resistance is relatively high among fluororesins. Also, it is low in friction coefficient and tackiness, high in chemical resistance. PTFE is a compression moldable homopolymer of a tetrafluoroethylene. Its thermal decomposition temperature is 508°–538° C. A commercial version of PTFE is available from Kitamura in the name of "400H".

Other than PTFE, the perfluororesin used in this invention may be a tetrafluoroethylene-perfluoroalkylvinylether copolymer (PFA, thermal decomposition temperature: about 464° C. or higher), a tetrafluoroethylene-hexafluoropropylene copolymer (FEP, thermal decomposition temperature: about 419° C. or higher), or a tetrafluoroethylene-hexafluoropropyleneperfluoroalkylvinylether copolymer (EPE, thermal decomposition temperature: about 440° C. or higher). The following resins may be further added to the above resin: polychlorotrifluoroethylene (PCTFE, thermal decomposition temperature: about 347°–418° C.), tetrafluoroethylene-ethylene copolymers (ETFE, thermal decomposition temperature: about 347° C. or higher), chlorotrifluoroethylene-ethylene copolymers (ECTFE, thermal decomposition temperature: about 330° C. or higher), polyvinylidene fluoride (PVDF, thermal decomposition temperature: about 400°–475° C.), or polyvinyl fluoride (PVF, thermal decomposition temperature: about 372°–480° C.).

Also, the perfluororesin may be a copolymer obtained by polymerizing two or more of the abovementioned fluororesin monomers in the ratio of 1:10 to 10:1, or their terpolymers such as fluorinated polyolefin. They have the properties as solid lubricants. Among them, PTFE is especially desirable because of its superior heat resistance, chemical resistance, non-tackiness, and low friction coefficient.

These perfluororesins are preferable because they have a fairly high derivative thermal decomposition starting temperature. For example, PTFE and PVDF have thermal decomposition temperatures of about 490° C. and about 350° C., respectively, and derivative thermal decomposition starting temperatures of about 555° C. and about 460° C., respectively. PTFE, PFA and FEP are especially desirable because they have excellent high-temperature properties. Thus, a resin composition containing one of these resins can well withstand heat history when it is melted and molded into an oil-submerged sliding member. PTFE is especially desirable because its thermal decomposition temperature is 100°–200° C. higher than that of PAS resin, which is about 280°–290° C.

By adding these perfluororesins by 2–25 parts by weight, preferably 5–25 parts by weight, it is possible to improve the mechanical properties and creep resistance with compressive strength of 50–200 MPa. Also, the resin composition will show excellent heat resistance, oil resistance, chemical resistance, together with improved shock resistance, fatigue resistance and wear resistance.

If the content of such resins is less than 2 parts by weight, the abovementioned advantages will not be achievable. Also, sliding properties such as self-lubricity and wear resistance will scarcely improve. If over 25 parts by weight, the load on the cylinder of a melt molder will increase during pelletizing or injection molding due to increased melt viscosity. This impairs moldability of the resin, making stable pelletizing or injection molding difficult. This in turn makes it difficult to form an end product with high dimensional accuracy. The mechanical properties of the end product may thus deteriorate.

If powdered PTFE is added to PAS resin, its shape and size are not limited. For uniform resin composition, the particle size of such powdered PTFE preferably has a particle size of 70 $\mu$m or less.

Instead of virgin PTFE powder, recycled PTFE powder may be used. The recycled polytetrafluoroethylene resin powder (hereinafter abbreviated to recycled PTFE powder) is a powder obtained by calcining and pulverizing virgin tetrafluoroethylene resin. Since such a recycled material is a powder, it can be added to a resin composition without the possibility of unduly increasing the melt viscosity of the composition and thus impairing its injection moldability. Also, since a recycled powder is calcined, it will never cause variations in dimensions and shape of the injection-molded products, or cracks in the end products.

A polytetrafluoroethylene resin, which is the material for recycled PTFE powder, comprises a skeleton of carbon atoms completely surrounded by fluorine atoms. Due to strong C—F bonds, its heat resistance is the highest of the fluororesins. Also, it is low in friction coefficient and tackiness, and high in chemical resistance. Its thermal decomposition temperature is 508°–538° C.

Recycled PTFE powders are commercially available from e.g. Kitamura in the model number of KT300H, KT400M, KT400H and KTL610.

Recycled PTFE powder and other perfluoro resin should be added by 2–25% by weight, preferably 5–15% by weight, with respect to the entire resin composition. Addition of less than 2% by weight will have no effect in improving the sliding properties and attacking tendency on mating members. If added more than 25% by weight, it will hamper moldability of the composition.

Further, molybdenum disulfide may be added to the oil-submerged sliding member by not more than 10% by weight, preferably 0–7% by weight, more preferably 1–6% by weight.

Even if added more than 10% by weight, molybdenum disulfide cannot improve the sliding properties any further and can hamper moldability of, the resin Composition.

Like polytetrafluoroethylene resin, molybdenum disulfide is a low-friction-coefficient additive used as a solid lubricant which is especially suited for use in oil. But if the lubricating oil used contains an extreme pressure additive which can sufficiently improve the sliding properties of the seal ring, it may be unnecessary or even harmful to add molybdenum disulfide to the sliding member, because it can deteriorate, though slightly, the wear resistance of the sliding member.

Commercially available molybdenum disulfides include MOLYKOTE Z powder made by Dow Corning.

Other additives may be used in such amounts that the effects of the invention will not be impaired. For example, solid lubricants, fillers such as talc, powder fillers and pigments that are stable at 350° C. or higher may be added to improve self-lubricity, mechanical strength and thermal stability and to color the composition. For example, a wear resistance improver may be added to further improve lubricity of the resin composition. Such wear resistance improvers include carbon, graphite, mica, wollastonite, phosphate, carbonate, stearate, high-molecular-weight polyethylene and whiskers of calcium sulphate, etc. and powder of metallic oxides such as molybdenum disulfide. If these additives are added, the content of the remaining heat-resistant resin is preferably kept at not less than about 40% by weight.

These additives may be mixed into the heat-resistant resin by any known, ordinarily practiced method, such as by dry-mixing the resin as the main ingredient and other substances all at once or separately in a Henschel mixer, ball mill, tumbler mixer or any other mixer, and supplying the mixture into an injection molder or a melt extrusion molder having good melt mixing property, or by melting and mixing the raw materials in a heat roll, kneader, Banbury mixer or melt extruder beforehand.

An oil-submerged sliding member may be molded from the above-mentioned resin composition by any known method, such as ordinarily practiced compression molding, extrusion molding or injection molding. Otherwise, a sliding member may be formed by melting and mixing the composition, pulverizing the mixture in a jet mill or a freeze crusher into a desired grain size. Among these methods, injection molding method is most desirable because it is high in productivity and thus makes it possible to mold oil-submerged sliding members at a low cost.

The thus obtained grains such as pellets may be dried to the same degree as with the heat treatment to be described later before molding. By evaporating water content in the grains such as pellets, it is possible to form a blister-free oil-submerged sliding members and prevent drop in strength.

The oil-submerged sliding member thus formed should preferably be subjected to annealing for about 0.1–24 hours at about 85°–260° C. to ensure high dimensional accuracy of the sliding member when used at high temperatures by removing strains during heat fixing and molding.

Such annealing should preferably be conducted at about 260° C. or less, e.g. about 85°–260° C. This temperature may be adjusted to about 85°–230° C. or about 85°–200° C. according to the shape and dimensions of the sliding member. These PAS resins show high rigidity within a wide temperature range and is high in shock resistance, creep resistance and strain resistance. They are also resistant to most kinds of oils and chemicals. These resins are crystalline, and as its crystallinity increases, its strength and rigidity increase, the wear resistance and lubricity improve, and the thermal expansion coefficient and water absorption decrease.

If the heat treatment temperature is lower than about 85° C., an extremely long time is needed for crystallization to proceed. It is also difficult to remove even slight strains in the oil-submerged sliding member, so that its dimensional stability is poor.

If the annealing is carried out at a temperature higher than the thermal deformation temperature of the seal ring as the oil-submerged sliding member by more than about 20°–30° C., the influence of heat history on the resin will increase to an undesirable level. Thus, care should be taken so that the annealing temperature will not exceed this level. It may be increased in stages at intervals of about 15–60 minutes between stages e.g. from normal temperature to about 80° C., to about 130° C., to about 180° C., to about 220° C., to about 230° C., and to about 260° C., taking about 15–180 minutes in total, and maintained at the highest temperature for about 15–480 minutes. If this time is too short, the resin will not crystallize sufficiently, making it difficult to maintain dimensional stability. If this time is too long, the sliding member may suffer undesirable thermal deformation such as "warping". Also, energy consumption of e.g. an electric furnace will grow excessively, thus pushing up the manufacturing cost.

Also, the heat treatment temperature may be maintained at about 85°–120° C. for a given period of time. This will completely remove any small amount of water content remaining in the oil-submerged sliding member before crystallization. It is not desirable to increase the heat treatment temperature too quickly to the predetermined point and terminate the heat treatment because by doing so, water content in the sliding member will be heated beyond the boiling point and vaporize. When the water vaporizes, its volume increases dramatically. The oil-submerged sliding member may thus suffer "blisters".

After crystallization, the sliding member may be cooled in stages, in a similar manner to the heating steps in the reverse direction. Otherwise, it may be cooled gradually and continuously, taking about 60–180 minutes.

By subjecting the oil-submerged sliding member to such heat treatment, it is possible to prevent the sliding member from suffering blisters and other defects. Also, since the resin is crystallized gradually and steadily, it is possible to form an oil-submerged sliding member with high dimensional accuracy in a stable manner.

At least one of the oil-submerged sliding member and the mating member to be brought into sliding contact with the sliding member should have a surface roughness of about 3–25 μm or less, preferably about 8 μm or less, most preferably 3 μm or less, as measured in Rmax, Ra, Rz under JIS. If the surface roughness is too large, the sliding surfaces may be damaged. Damaged sliding surfaces tend to quicken wear. Taking into consideration the machining efficiency, the lower limit of the surface roughness should be 0.1 μm.

But it takes a long time and is inefficient to finish the surface of the mating member to the lower limit. Also, such smooth surface may make it difficult to form a transition film on the resin member. Thus, if wear is not a big problem, the surface roughness may be about 3–8 μm or less.

Mating members such as a piston and a cylinder may be made of carbon steel such as S45C. or SCM420H, spheroidal graphite cast iron such as FCD45, a hardened material obtained by hardening them, or a soft material such as an aluminum alloy like ADC12. Mating members are preferably made of a cast metal which is high in machining efficiency and productivity and low in price, especially a lightweight alloy of cast metal such as ADC.

Description is now made of an oil seal ring formed from the oil-submerged sliding member molded from the above-described resin composition.

A seal ring having abutments that do not radially overlap with each other is prepared by injection molding in a known manner. As shown in FIG. 1, a gap is defined between the abutments 5 of the seal ring 4 thus obtained. The seal ring 4 is prepared by injection molding in a mold having a material injection point 6, that is, a gate 7 displaced slightly (about ±10°–±30°) from the point diametrically opposite to the gap between the abutments 5.

The injection point 6 is slightly displaced because stress tends to concentrate on the center of its length when the seal ring is mounted in a seal groove in a mating member. Especially if the seal ring has step-cut abutments, it is possible to prevent excessive force from acting on the gate during heat fixing after molding or even if the seal ring is opened or closed by an additional length corresponding to the length of the protrusions of the step-cut abutments when the seal ring is mounted in the seal groove.

Figure 2:
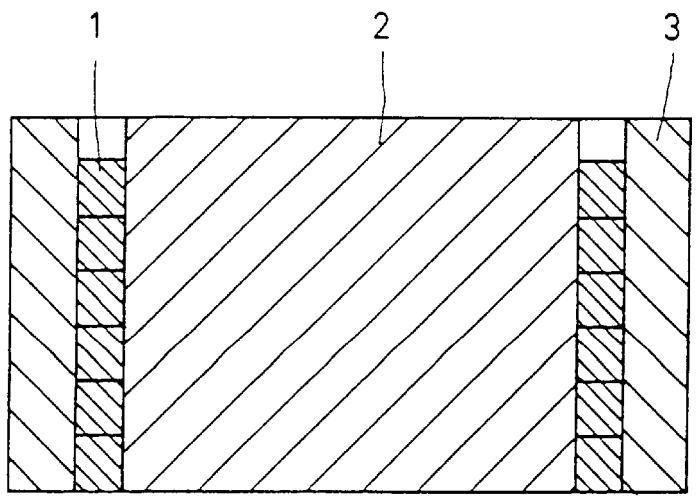
FIG. 2 is a sectional view showing how oil seal rings are heat-fixed.

A plurality of seal ring members 1 formed by injection molding are set in a jig comprising a cylindrical member 2 and a ring gauge 3 as shown in FIG. 2. That is, the seal ring members 1 are inserted in the ring gauge 3 of the jig and then the cylindrical member 2 is inserted in the seal ring members 1. As the resin material for the cylindrical member 2, a material having a higher thermal expansion coefficient than the material for the ring gauge 3, e.g. a polymer such as a resin or elastomer should be selected so that the seal ring members 1 are pressed against the ring gauge 3 by the cylindrical member 2 due to its thermal expansion when the jig is heated.

If the cylindrical member 2 is made of an elastomeric polymer, its hardness (Hs) should be about 60–100, preferably 65–90, to press the seal ring members 1 at a suitable elastic pressure. If it is too hard, it is difficult to insert the member 2 into the seal ring members 1. If too soft, it will be impossible to press the seal ring members 1 at a suitable pressure.

The jig is then put in a furnace such as an electric furnace and heated to a temperature higher than the glass transition point of the base resin of the seal ring members 1 to thermally fix the seal ring members 1.

The seal ring thus formed may be used as it is. But such a seal ring may get caught by the mating member at its corners when slid on the mating member. Also, the corners may hinder the supply of lubricant. Thus, if necessary, the corners may be chamfered or shoulders or lubricant grooves may be formed at the corners. Such chamfers, shoulders and lubricant grooves are shown in FIG. 3. FIGS. 3A–3F show a seal ring 10 having step-cut type abutments 19. The abutments 19 may be shaped in many different ways according to the intended use of the ring.

The seal ring 10 has lubricant grooves 12 formed at three points spaced from one another at equal angular intervals and extending across a sealing surface 11 on one side of the seal ring 10 from its inner to outer side. Also, similar lubricant grooves 12 are formed across a sealing surface 21 on the other side at positions slightly displaced from the grooves 12 on the opposite side.

Each groove 12 is so small, with a depth of about 0.1 mm and a width of about 0.1 mm, that the grooves 12 provided at 1–5 points as shown, preferably 1–3 points, of the seal ring will never impair the sealing ability of the seal ring. Chamfers 13 are formed at the boundaries between the side walls of the lubricant grooves 12 and the sealing surfaces 11.

Figure 3A:
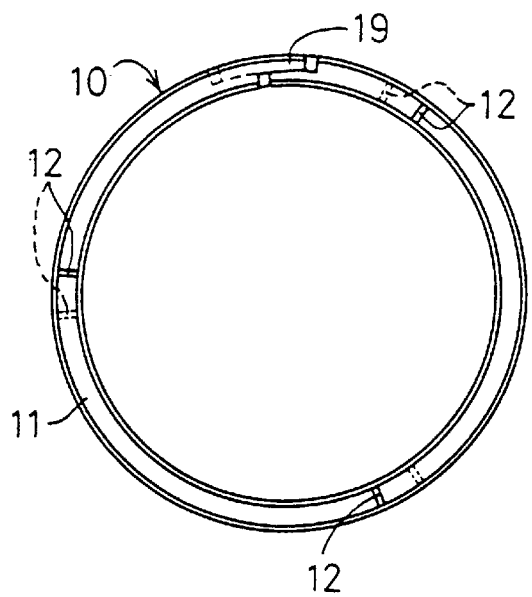
FIG. 3A is a front view of another type of oil seal ring according to this invention.
Figure 3C:
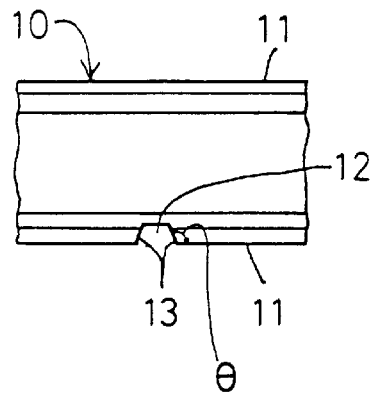
FIG. 3C is a partial enlarged plan view of FIG. 3A.
Figure 3B:
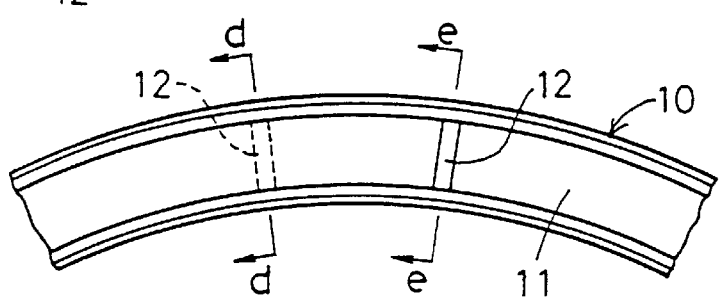
FIG. 3B is a partial enlarged front view of FIG. 3A.

As shown in FIG. 3C, the lubricant grooves 12 have side walls that form an obtuse angle θ, i.e. an angle θ larger than 90° and smaller than 180°, preferably 120°–135°, with the sealing surfaces 11. By varying the angle θ, it is possible to adjust the area of the open end of each groove 12, so that burrs that may develop when a mold is used are easily removable by barreling.

Lubricant leaks inwardly along the sealing surfaces on both sides of the ring through the lubricant grooves 12 while maintaining sufficient sealability of the ring. Thus, as the ring rotates relative to the mating member, lubricant film is formed on the sealing surface over its entire width and circumference. Lubricating properties thus improve over the entire area of the sealing surface, so that the friction between the ring and the mating member decreases. Thus, the ring is less likely to damage the mating member. When lubricant becomes scarce, a fresh supply of lubricant will be fed through the lubricant grooves, so that the ring can rotate smoothly for a long time.

Figure 3D:
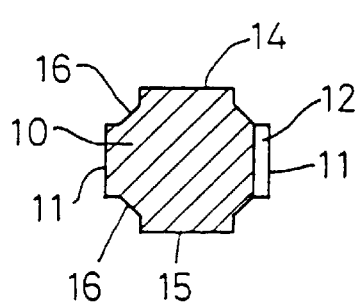
FIG. 3D is a sectional view taken along line D—D of FIG. 3B.
Figure 3E:
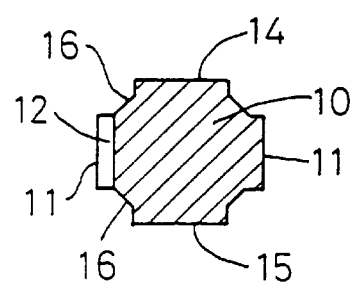
FIG. 3E is a sectional view taken along line E—E of FIG. 3B.
Figure 3F:
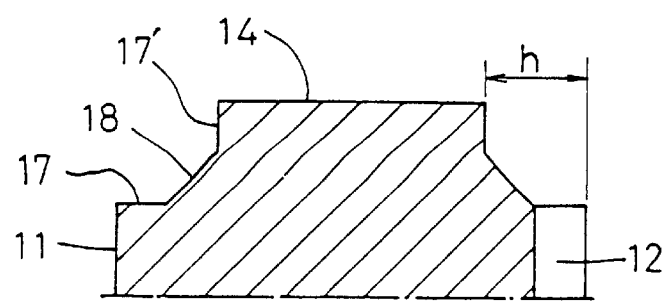
FIG. 3F is a partial enlarged sectional view of FIG. 3D.

As shown in FIGS. 3D and 3E, the seal ring 10 has steps 16 formed along the boundaries between the sealing surfaces 11 and the outer surface 14 and between the sealing surfaces 11 and the inner surface 15. As shown in FIG. 3F, the steps 16 each comprise a surface 17 perpendicular to the sealing surfaces 11, a surface 17' perpendicular to the outer surface 14, and an inclined surface 18 connecting the surfaces 17 and 17'. Their height h is greater than the depth of the lubricant grooves 12.

While the height h of the steps 16 is not limited, it is preferably about 5–50%, more preferably about 5–25%, most preferably about 5–10%, of the width or thickness of the rectangular section of the seal ring 10.

If the height h of the steps is too small, problems may arise if the relative position between the movable mold and the fixed mold varies at short intervals after the molds have been used for a long time. If too large, the sealing surface area of the seal ring or seal land area will decrease, making it difficult for the seal ring to perform its sealing function in a full and stable manner.

The abutments 19 come in a straight-cut type, step-cut type and composite step-cut type. According to the intended use, one of these types is selected. Composite step-cut type abutments are described below.

Figure 4A:
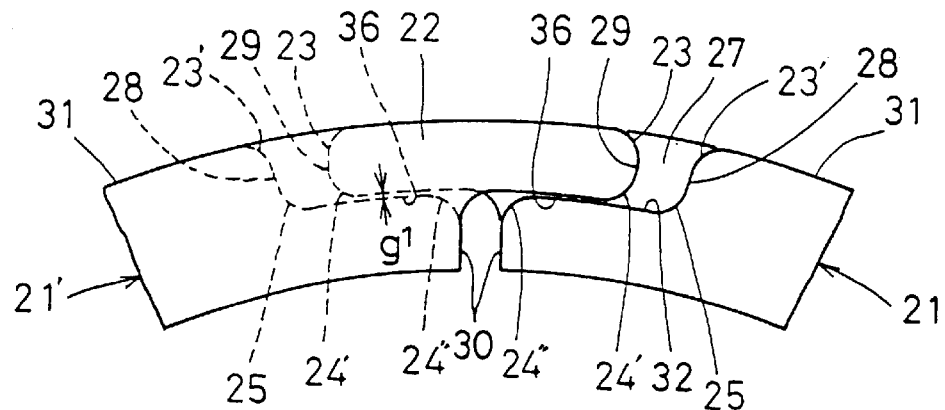
FIG. 4A is a partial front view of an oil seal ring according to this invention, showing its abutments.
Figure 4B:
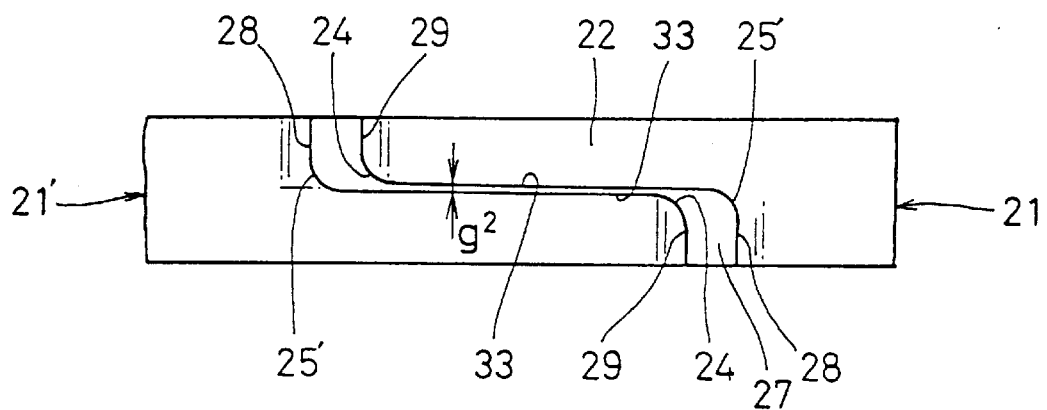
FIG. 4B is a partial enlarged plan view of the same.
Figure 4C:
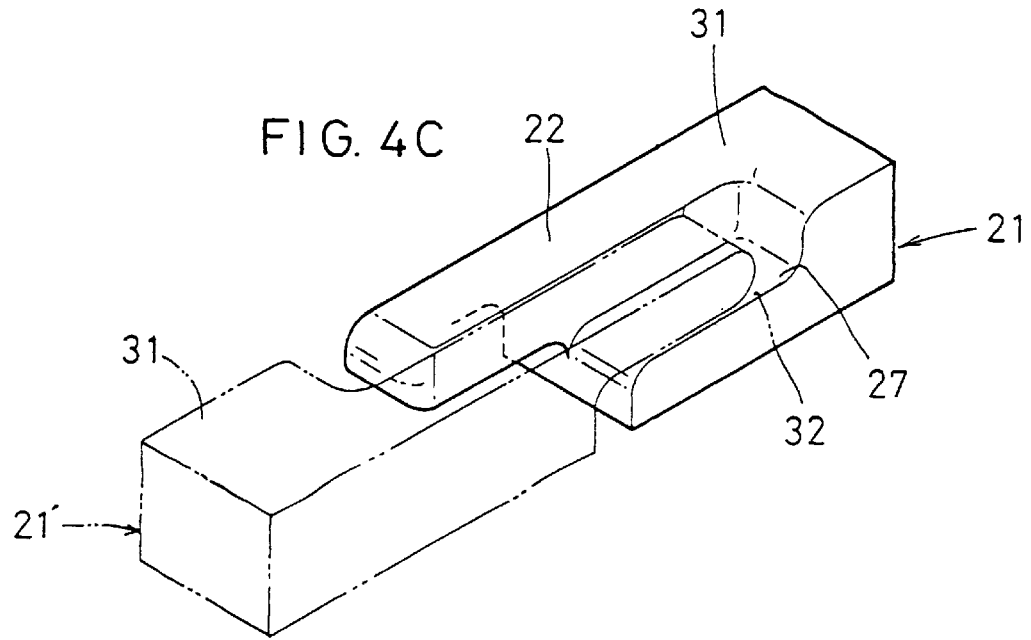
FIG. 4C is a partial perspective view of the same.
Figure 5:
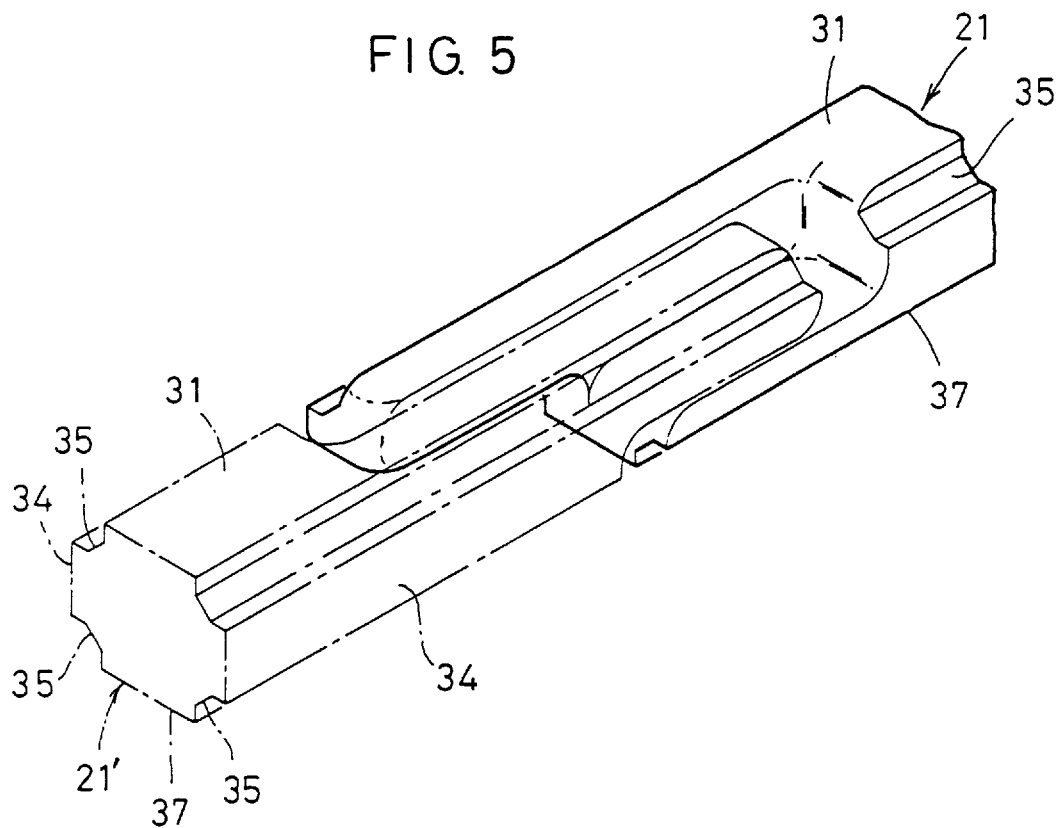
FIG. 5 is a partial perspective view of a seal ring similar to the seal ring shown in FIG. 4A but having grooves.

The seal ring shown in FIGS. 4A, 4B and 4C has composite step-cut type abutments 21, 21'. The abutments 21, 21' each comprise a protrusion 22 and a shoulder 27. The protrusion 22 and the shoulder 27 of one of the abutments 21 and 21' are complementary in shape to the shoulder 27 and the protrusion 22 of the other abutment. The abutments 21, 21' fit together, keeping a predetermined space therebetween.

More specifically, the protrusion 22 of the abutment 21' is provided at the radially inner portion and the transversely inner portion of the ring body and protrudes circumferentially from an end face 30 of the abutment 21'. The shoulder 27 extends from the end face 30 in the opposite direction. The outer periphery of the protrusion 22 smoothly connects with and has the same curvature as the outer periphery of the ring body.

The shoulder 27 is provided at the radially outer half portion and the transversely inner half portion of the ring body. Its surface 32 has the same curvature as the inner periphery of the ring body.

The other abutment 21 is complementary to the abutment 21'. The abutment 21 and 21' are fitted together with a predetermined space left therebetween. The seal ring as a whole is substantially completely round.

The abutments 21, 21' may be formed with chamfers and fillets. Chamfers may be arcuate ones with a predetermined radius of curvature as shown, or flat ones with no radius. Chamfers may have such a shape that its radius of curvature changes continuously. Such chamfers and fillets make it possible to eliminate or minimize any protrusion of tips of the abutments 21, 21' and thus to prevent local contact between the abutments or between the seal ring and the mating member.

The abutments 21, 21' may be formed with the following chamfers and fillets: a chamfer 23 formed at the boundary between the end face 29 of each protrusion 22 and its outer surface 31; a chamfer 23' formed at the boundary between the end face 28 of each shoulder 27 and the outer surface 31 of the ring body; a chamfer 24 formed at the boundary between the end face 29 of each protrusion 22 and its inner side face 33; a chamfer 24' formed at the boundary between the end face 29 of each protrusion 22 and its bottom surface 36; a chamfer 24" formed at the boundary between the top surface 32 of each shoulder 27 and the end face 30 of the abutment; a fillet 25' formed at the boundary between the end face 28 of each shoulder 27 and the inner side face 33 of the protrusion 22; and a rounded fillet 25 formed at the boundary between the end face 28 of each shoulder 27 and its top surface 32. At any other edges or corners, chamfers or fillets may be formed.

In order to prevent contact between the abutments 21 and 21', a gap g1 (FIG. 4A) may be provided between the bottom surface 36 of the protrusion 22 of one of the abutments 21 and 21' and the top surface 32 of the shoulder 27. The gap g1 serves to further reduce the protruding length of the protrusions 22 from the outer periphery of the seal ring by absorbing dimensional errors of the protrusions 22 and the shoulders 27 in the thickness direction.

Also, a gap g2 (FIG. 4B) may be provided between the inner side faces 33 of the protrusions 22 of the abutments 21 and 21'. The gap g2 prevents the protrusions 22 from protruding from the sides of the seal ring by absorbing dimensional errors of the protrusions 22 in the width direction.

Further, grooves 35 may be formed along the boundaries between the outer surface 31 of the ring body and its sides 34 and between the inner surface 37 and the sides 34. They are sized so as not to impair the sealability of the seal ring.

Figure 6A:
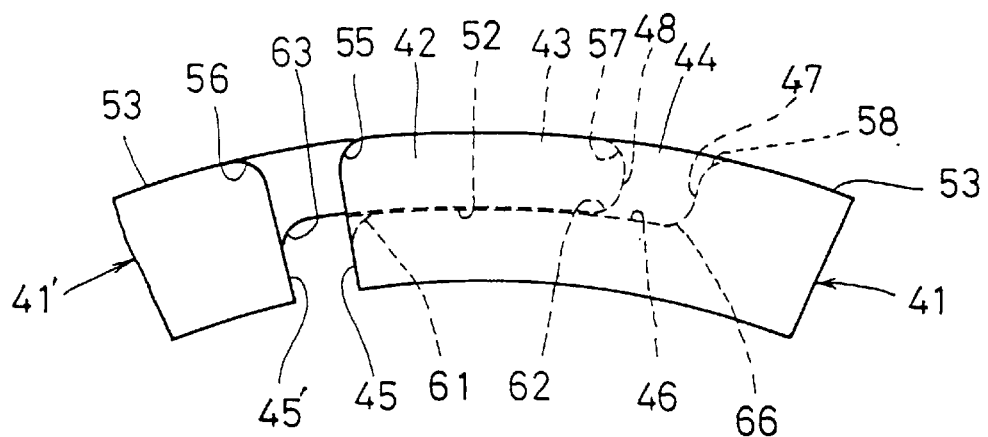
FIG. 6A is a partial front view of another oil seal ring according to this invention, showing its abutments.
Figure 6B:
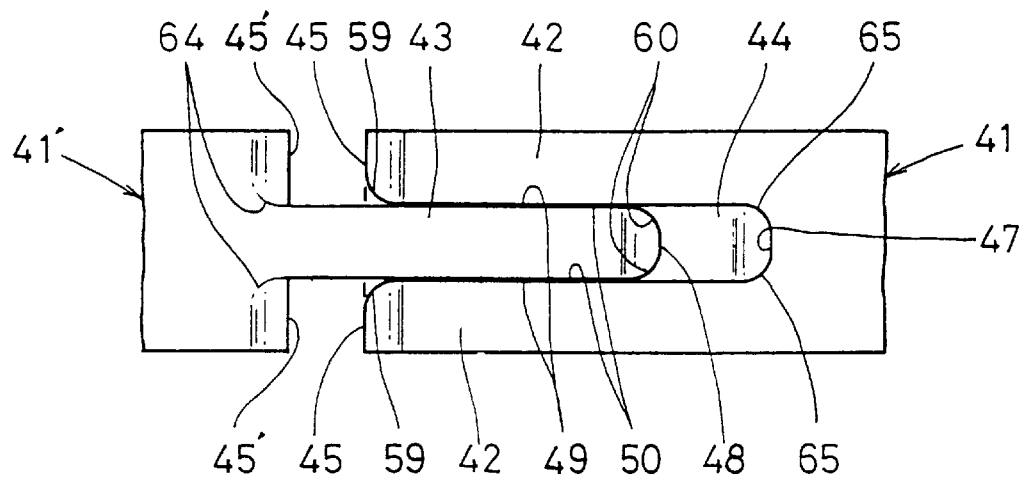
FIG. 6B is a partial enlarged plan view of the same.
Figure 6C:
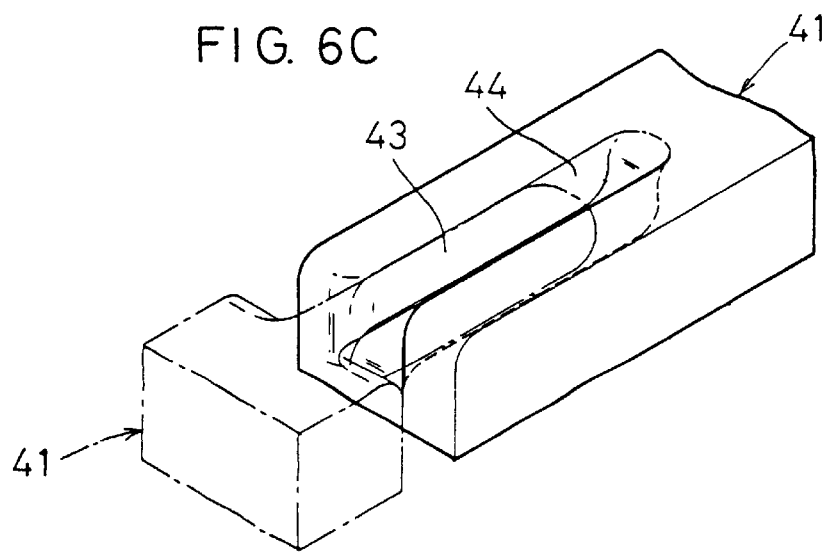
FIG. 6C is a partial perspective view of the same.

FIGS. 6A, 6B and 6C show a different type of composite step-cut abutments 41, 41' of a seal ring. The abutment 41' has a protrusion 43 provided on the outer surface 53 of the end face 45' of the ring body at its transverse center. The other abutment 41 has a recess 44 formed in the outer surface 53 thereof at its transverse center. The recess 44 is complementary in such a shape as to receive the protrusion 43.

By fitting the protrusion 43 in the recess 44, the end face 45' of the abutment 41' comes into abutment with the end face 45 of the abutment 41. The length of the protrusion 43, i.e. the distance between the end face 45' of the ring body and the end face 48 of the protrusion 43, may be equal to the length of the recess 44, i.e. the distance between the end face 47 of the recess 44 and the end face 45 of the ring body, or the former may be shorter than the latter provided the abutments can be coupled together with sufficient strength.

In this arrangement, since the abutments 41 and 41' are fitted together at the transverse center of the ring, any deformation or warp that may develop during injection molding will not cause any part of the abutments to protrude to one side of the ring body. Thus, it is possible to maintain the width of the seal ring with high accuracy by machining its sides.

Fillets or chamfers may be formed at the boundaries between any adjacent sides of the abutments 41, 41' to reduce the amount of protrusion between the abutments 21 and 21' or between the abutments and the mating member to a minimum or to zero and thus to prevent local contact.

Specifically, chamfers and fillets that can be formed on the abutment 41' include: chamfer 56 at the boundary between the outer surface 53 and the end face 45'; chamfer 57 at the boundary between the outer surface 53 of the protrusion 43 and its end face 48; chamfers 60 at the boundaries between the side faces 49 of the protrusion 43 and its end face 48; chamfer 62 at the boundary between the end face 48 of the protrusion 43 and its bottom surface 52; fillet 63 at the boundary between the bottom surface 52 of the protrusion 43 and the end face 45' of the ring body; and fillets 64 at the boundaries between the side faces 49 of the protrusion 43 and the end face 45' of the ring body.

The abutment 41 may be provided with the following chamfers and fillets; chamfers 55 at the boundaries between the outer surfaces of the protrusions 42 on both sides of the recess 44 and the end face 45 of the ring body; chamfer 58 between the end face 47 of the recess 44 and the outer surface 53, chamfers 59 at the boundaries between the side faces 50 of the recess 44 and the end face 45 of the ring body; chamfer 61 at the boundary between the bottom surface 46 of the recess 44 and the end face 45 of the ring body; fillets 65 at the boundaries between the end face 47 of the recess 44 and its side faces 50; and fillet 66 at the boundary between the end face 47 of the recess 44 and its bottom 46. Fillets and/or chamfers may also be formed at corners other than those mentioned above.

While such chamfers and fillets may be arcuate surfaces with a radius or flat surfaces with no radius, arcuate surfaces are preferable. The minimum size of chamfers and fillets should be about 5%–50%, preferably about 5%–25%, of the width or thickness of the seal ring. If this value is too small, the mating members might be damaged by the abutments if they protrude slightly.

The maximum size of chamfers and fillets should be about 5%–50%, preferably about 25%–50%, of the outer or inner diameter of the seal ring or a value therebetween. If this value is too large, the chamfers can scarcely reveal their expected functions, because the curvature of such large chamfers is practically no different from that of the outer periphery of the seal ring. That is, such chamfers cannot reduce the amount of protrusion of the abutments to zero or near zero. Thus, the chamfers should be sized so as not to be smaller than abovementioned minimum value while not exceeding the abovementioned maximum value.

Further, as shown in FIG. 7, grooves 68 may be formed along the boundaries between the side faces 67 of the ring body and its outer surface 53 and inner surface 54. They are sized so as not to impair the sealability of the seal ring.

(EXAMPLES)

Raw materials used in Examples of the invention and Comparative Examples are shown below. Their abbreviations are shown in brackets ( ).

1. PAS
    (1) K4 by Tohpren (crosslinked) (PPS-1)
    (2) T4 by Tohpren (semi-crosslinked) (PPS-2)
    (3) LCS-7 by Tohpren (linear) (PPS-3)
2. Carbon fiber
    (4) KUREKA CHOP M201F by Kureha Chemical (pitch fiber, 12.5 μm in diameter) (CF-1)
    (5) KUREKA CHOP M107T by Kureha Chemical (pitch fiber, 18.0 μm in diameter) (CF-2)
    (6) BESFIGHT HTA-C6-E by Toho Rayon (PAN fiber, 6.7 μm in diameter) (CF-3)
3. Recycled PTFE powder
    (7) KT400H by Kitamura (PTFE-1)
4. virgin PTFE
    (8) Teflon 7J by Mitsui Dupont Fluorochemical (PTFE-2)
5. Molybdenum disulfide
    (9) MOLYKOTE Z powder by Dow Corning (MoS2)

(EXAMPLES 1–9 and Comparative Examples 1–14)

Raw materials were dry-mixed in the amounts (wt %) shown in Table 1 and 2 in a Henschel mixer, pelletized by melt extrusion in an extruder, injection-molded at an injection pressure of 100 MPa while keeping the cylinder temperature at 350° C. and the die at 130° C. to provide cylindrical members measuring 21 mm in outer diameter, 17 mm in inner diameter and 10 mm in height. The cylindrical members were then annealed for one hour at 180° C. The test pieces thus obtained were subjected to the following tests.

(a) Thrust abrasion test

Each test piece was brought into sliding contact with mating members made of carbon steel (S45C) and die-casting aluminum alloy (ADC12) under the following conditions. The wear height of the specimen and the wear depth of the mating member are shown in Tables 1 and 2.

(test conditions)
surface pressure; 18.0 kgf/cm$^2$ (1.76 MPa)
speed: 128 m/min
mating members: S45C, ADC12 (both 3S in surface roughness)
time: 50 hours
atmosphere: room temperature
lubricant: GELCO ATF by Showa Shell (automatic transmission oil for automobiles)

As shown in Table 1 and 2, Examples 1–9 and Comparative Examples 1–4 were high in wear resistance and less likely to attack mating members, irrespective of whether the mating members were soft or hard.

Comparative Examples 10–13, whose fiber diameters were below the range defined in the present invention, were unduly high in their tendency to attack soft mating members.

Comparative Examples 10–13, which contained carbon fiber having a thickness below the predetermined range, were unduly high in their tendency to attack especially soft mating members (ADC12).

Comparative Example 5, which contained PTFE in an amount above the predetermined range, and Comparative Examples 9 and 10, which contained virgin PTFE, were too large in variations in self-wear.

Comparative example 14 was a seal ring made of cast iron and having an outer diameter of 44 mm, inner diameter of 40 mm and a width of 2 mm.

The Examples which achieved good results in the thrust abrasion test, i.e. Examples 1–9 and Comparative Examples 1–4 and 6–8, were injection-molded into oil seal rings (44 mm in outer diameter×40 mm in inner diameter×2 mm in width), and subjected to the following test for ease of fitting, sealing test and endurance test.

(b) Test for ease of fitting

Figure 8:
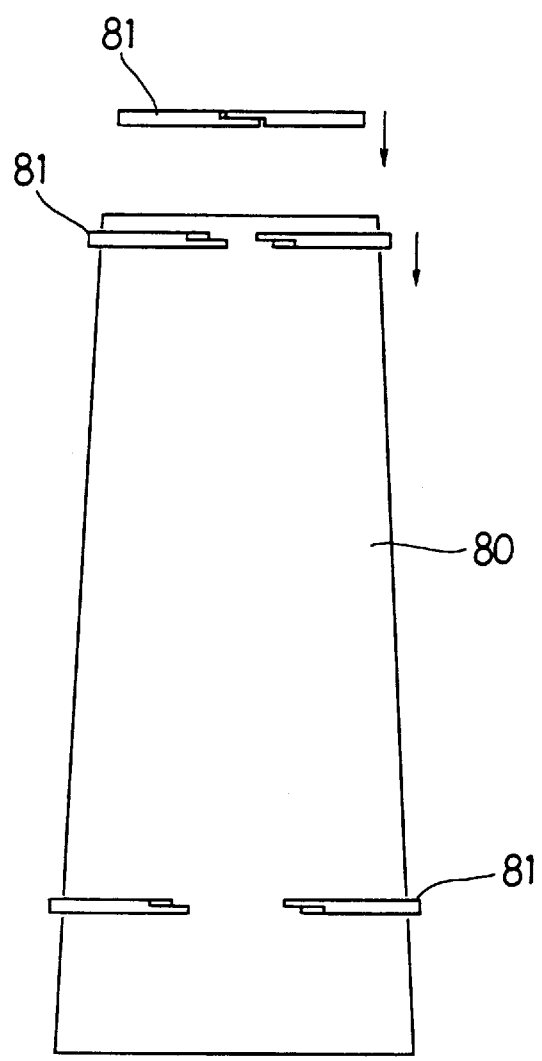
FIG. 8 is a vertical sectional view explaining the test for ease of fitting.

Each seal ring 81 was fitted slowly on a ⅒ tapered mandrel 80 shown in FIG. 8 from its small-diameter end and slid gradually toward the large-diameter end. Its diameter was measured when it was broken. The results are shown in Tables 1 and 2.

Although shaft diameters vary from one machine to another, seal rings have to have an opening rate (diameter at break/diameter in a normal state) of at least 120%. All the Examples except Comparative Example 8 (break diameter 47 mm, opening rate (47/40)×100=117.5%), of which the carbon fiber content was higher than the predetermined range, satisfied this requirement.

(c) Sealability test

Figure 9:
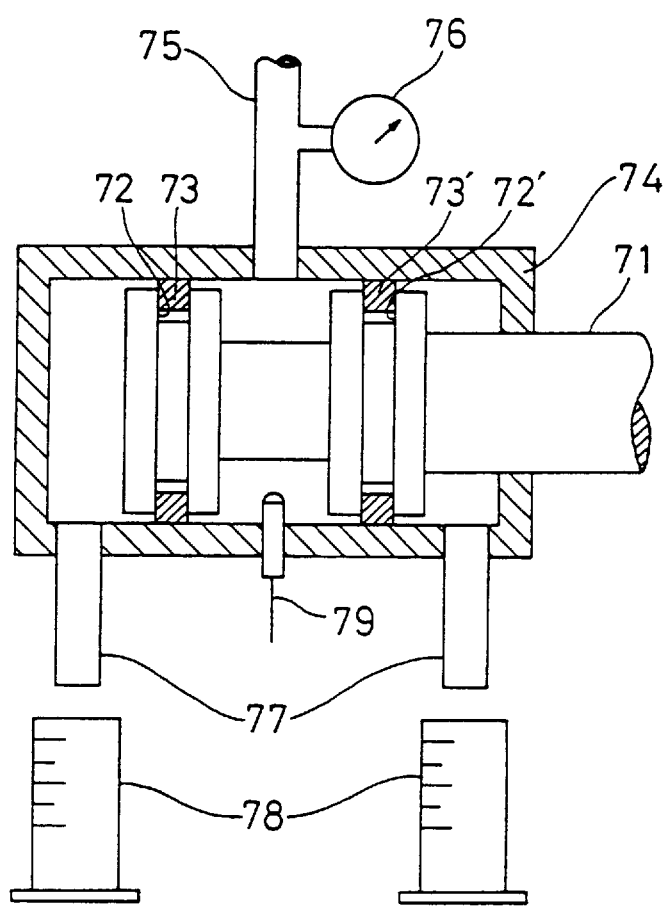
FIG. 9 is a vertical sectional view of a rotary tester.
Figure 10:
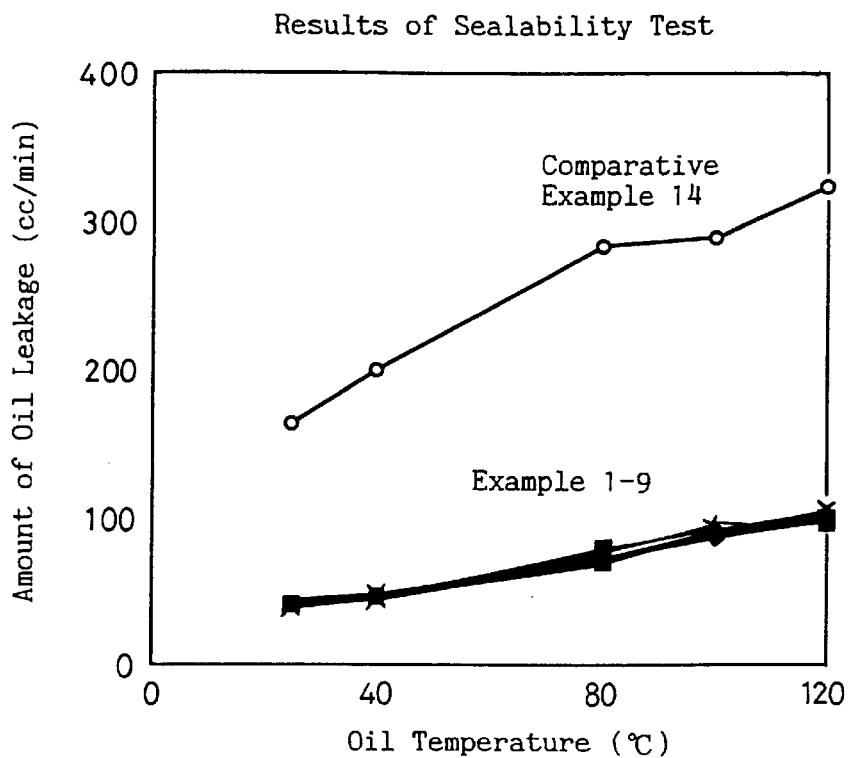
FIG. 10 is a graph showing the relationship between the amount of oil leakage and the oil temperature in the sealing test.
Figure 11:
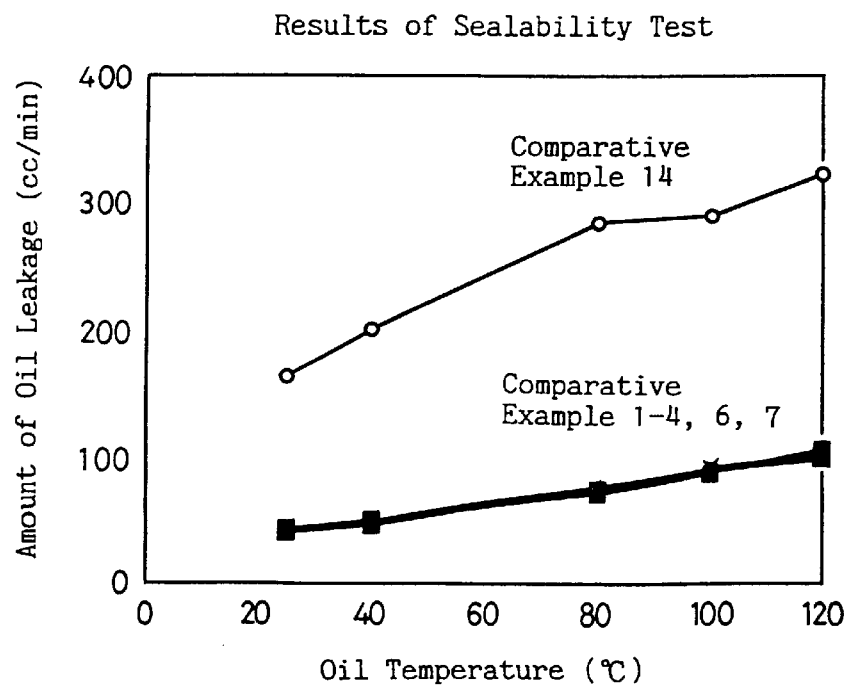
FIG. 11 is a graph showing the relationship between the amount of oil leakage and the oil temperature in the sealing test.
Figure 12:
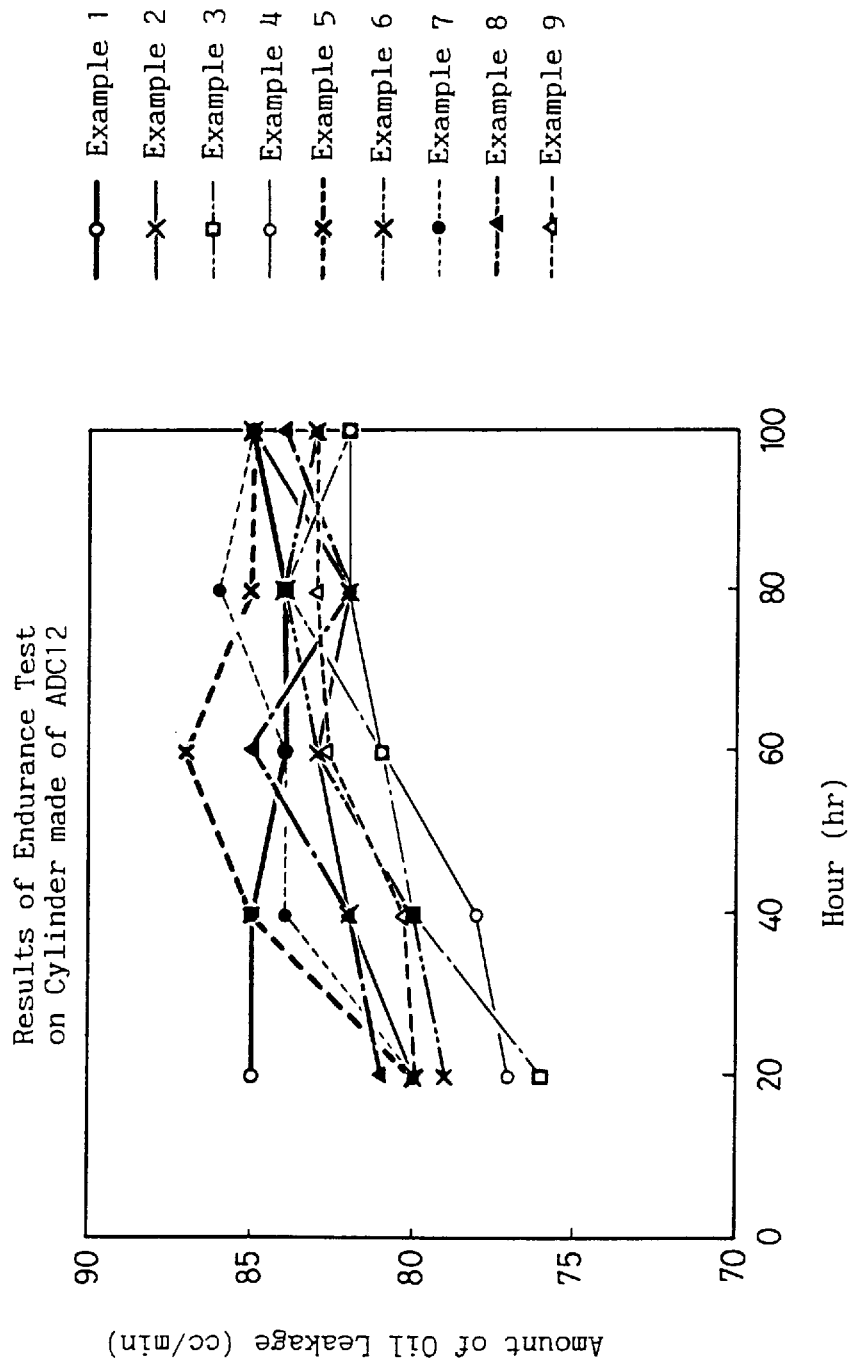
FIGS. 12–15 are graphs showing the relationship between the amount of oil leakage and the duration in the endurance test.
Figure 13:
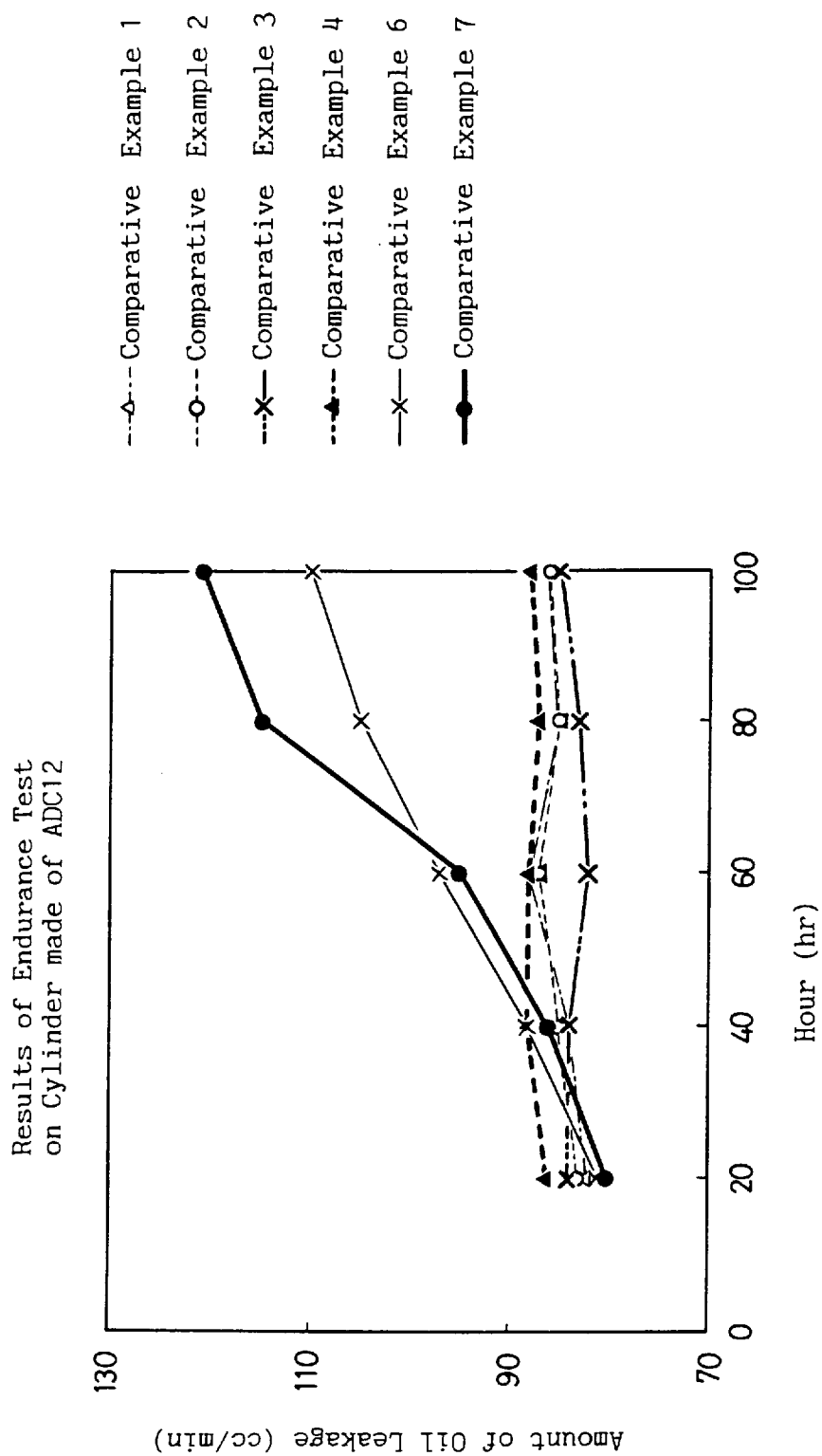
Figure 14:
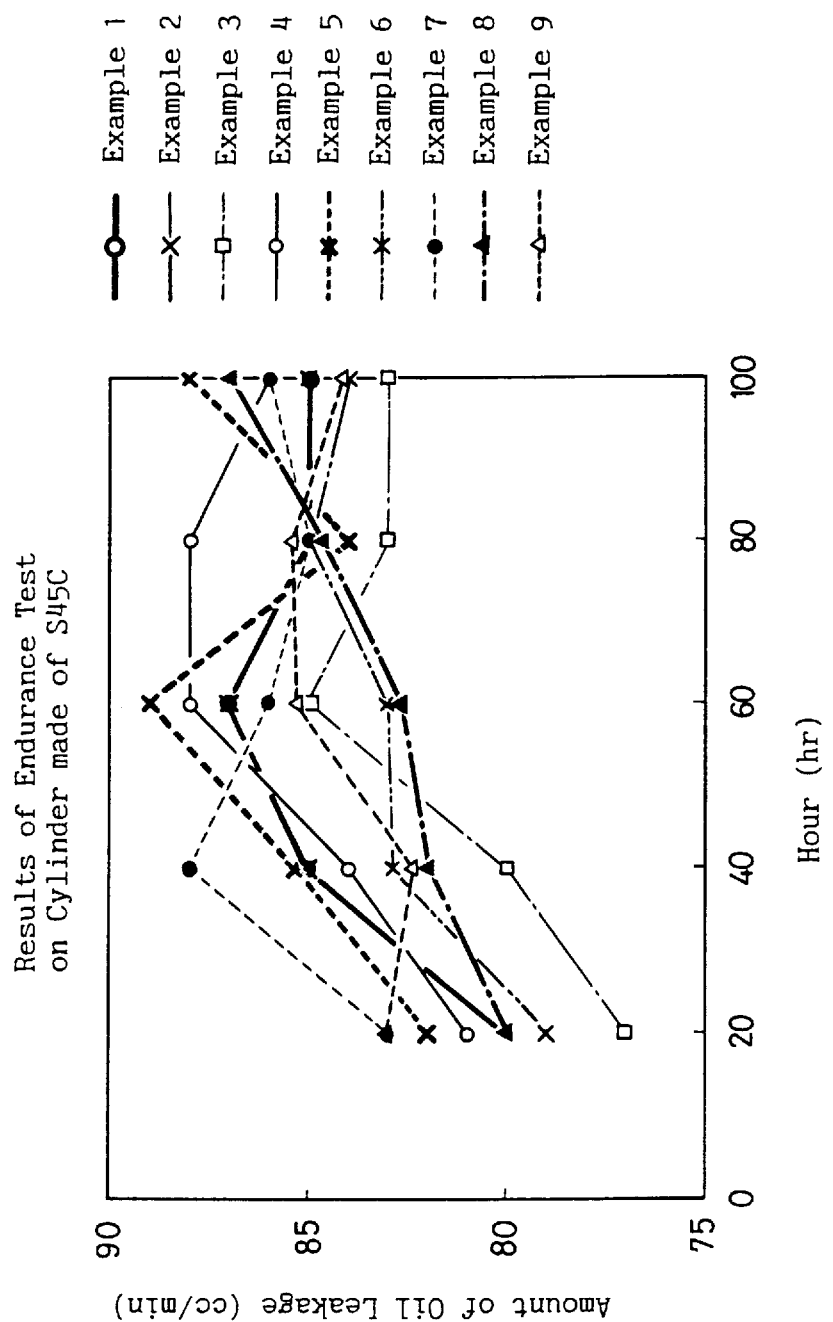
Figure 15:
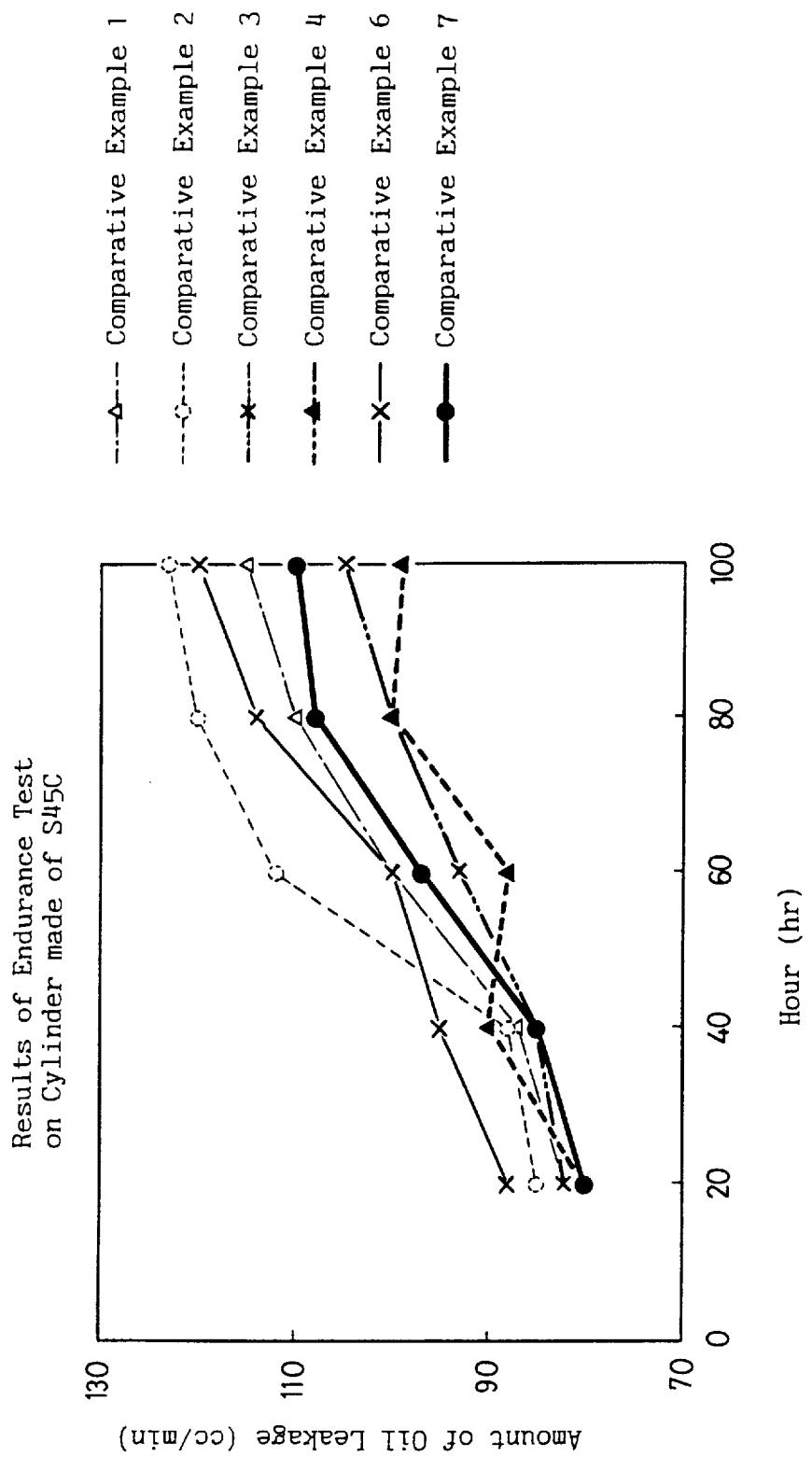

Oil seal rings 73 and 73' manufactured in the above manner were fitted in ring grooves 72 and 72' formed in a carbon steel (S45C) shaft 71 of a rotary tester shown in FIG. 9 so that the oil seal rings will come into sliding contact with the sides of the ring grooves 72 and 72' and the inner surface of a cylinder 74, which is made of S45C carbon steel. Then, pressurized oil was fed into the cylinder 74 from a pressure oil feed device (not shown) through a feed pipe 75, and the oil pressure was measured with an oil pressure gauge 76. The amount of oil leakage was determined by measuring the amount of oil in measuring cylinders 78 placed under discharge pipes 77 connected to the bottom of the cylinder 74 for receiving oil that has leaked through the seal rings 73, 73'. Also, the oil temperature was measured by a thermocouple 79. Test conditions are shown below. Test results are shown in FIGS. 10 and 11. For comparison, test results for cast iron seal rings, which have been used for the same purpose from before, are also shown.

(test conditions)

mating (cylinder) member: S45C, ADC12 (both 3S in surface roughness)

time: one minute lubricant: GELCO ATF by Showa Shell (automatic transmission oil for automobiles)

oil temperature: 25°, 40°, 80°, 100°, 120° C.

shaft revolving speed: 7000 rpm oil pressure: 10 kgf/cm$^2$ (0.98 MPa)

As is readily apparent from the sealing test results shown in FIGS. 10 and 11, Examples 1–9 and Comparative Examples 1–4, 6 and 7 were smaller in oil leakage, influenced less by the oil temperature, and higher in sealing properties than cast iron seal rings. For comparative example 14 made of cast iron, considerable oil leakage was observed.

(d) Endurance test

This test was conducted for 100 hours under the same conditions as the sealing test except that the oil temperature was 120° C., using cylinders 74 made of die-casting aluminum alloy ADC12 and carbon steel S45C.

During the test, the rate of oil leakage (cc/min) was measured every 20 hours. The results are shown in FIGS. 12–15. After the test, measurement was made of the depths of wear ($\mu$m) on the sides and the outer circumferential surfaces of the oil seal rings and the ring grooves of the shaft 71 made of S45C. Also, the depth of wear ($\mu$m) of the cylinders 74 made of ADC12 and S45C were measured. The measurement results are shown in Table 3. The test conditions were the same for the sealing test except that the oil temperature was 120° C.

From the results of the endurance test, it is apparent that the seal rings of the Examples 1–9 are high in self-wear properties and low in the tendency to attack mating members and thus high in sealability with minimum oil leakage, from FIGS. 12–15 and Table 3.

For Comparative Example 6, of which the PAS resin content was above the predetermined range, and Comparative Example 7, of which the carbon fiber content was below the predetermined range, self-wear properties were inferior and thus the oil leakage was high, though they were low in the tendency to attack mating members irrespective of whether they were soft or hard.

Comparative Examples 1–3, which contained linear PPS, and Comparative Example 4, which contained no PTFE, were abraded markedly and the sealing properties were extremely low when a cylinder made of a hard material, i.e. S45C was used as the mating member, although their self-wear properties were as high as the Examples when the cylinder made of a soft material, i.e. ADC12 was used.

The oil seal ring according to this invention, formed from an oil-submerged sliding member having a predetermined composition, exhibits superior wear resistance and sealing properties when brought into sliding contact with either a soft member made of e.g. die-casting aluminum alloy or a hard member made of e.g. carbon steel. By using this ring as a seal ring for a rotary shaft of e.g. an automotive automatic transmission, it can reduce oil leakage, making it possible to use a small-capacity oil pump and thus to reduce the size and weight of the entire device, irrespective of whether the mating member is made of a soft metal or a hard one.

TABLE 1

| | No. Examples | | | | | | | | |
|---|---|---|---|---|---|---|---|---|---|
| Contents (Wt %) | 1 | 2 | 3 | 4 | 5 | 6 | 7 | 8 | 9 |
| PPS-1 ① | 65 | — | — | 50 | 88 | 75 | — | 35 | — |
| PPS-2 ② | — | 65 | 65 | — | — | — | 50 | — | 60 |
| PPS-3 ③ | — | — | — | — | — | — | — | — | — |
| CF-1 ④ | — | 20 | — | 20 | 10 | — | 30 | 45 | — |
| CF-2 ⑤ | 20 | — | 20 | — | — | 10 | — | — | 25 |
| CF-3 ⑥ | — | — | — | — | — | — | — | — | — |
| PTFE-1 ⑦ | 10 | 10 | 10 | 25 | 2 | 15 | 13 | 20 | 5 |

TABLE 1-continued

| | No. Examples | | | | | | | | |
|---|---|---|---|---|---|---|---|---|---|
| | 1 | 2 | 3 | 4 | 5 | 6 | 7 | 8 | 9 |
| PTFE-2 ⑧ | — | — | — | — | — | — | — | — | — |
| MoS$_2$ ⑨ | 5 | 5 | 5 | 5 | — | — | 7 | — | 10 |
| Endurance test vs ADC12 | | | | | | | | | |
| Wear height (μm) | 31 | 30 | 32 | 28 | 38 | 33 | 35 | 30 | 32 |
| Wear of mating member (μm) | 3 | 4 | 4 | 2 | 6 | 3 | 4 | 9 | 5 |
| Endurance test vs S45C | | | | | | | | | |
| Wear height (μm) | 23 | 25 | 25 | 35 | 40 | 37 | 26 | 20 | 33 |
| Wear of mating member (μm) | 0 | 0 | 0 | 0 | 0 | 0 | 0 | 1 | 0 |
| **Break dia. (mm) | 60 | 63 | 60 | 71 | 67 | 74 | 58 | 52 | 55 |

**Fitting test

TABLE 2

| | No. Comparative Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Contents (Wt %) | | | | | | | | | | | | | |
| PPS-1 ① | — | — | — | — | 55 | 92 | — | — | 50 | 65 | 55 | — | — |
| PPS-2 ② | — | — | — | 75 | — | — | 70 | 40 | — | — | — | 88 | 65 |
| PPS-3 ③ | 65 | 88 | 50 | — | — | — | — | — | — | — | — | — | — |
| CF-1 ④ | 20 | — | — | — | 10 | — | 5 | 52 | 20 | — | — | — | — |
| CF-2 ⑤ | — | 10 | 30 | 20 | — | 6 | — | — | — | 20 | — | — | — |
| CF-3 ⑥ | — | — | — | — | — | — | — | — | — | — | 30 | 10 | 20 |
| PTFE-1 ⑦ | 10 | 2 | 13 | — | 30 | 2 | 20 | 8 | — | — | 10 | 2 | 10 |
| PTFE-2 ⑧ | — | — | — | — | — | — | — | — | 25 | 10 | — | — | — |
| MoS$_2$ ⑨ | 5 | — | 7 | 5 | 5 | — | 5 | — | 5 | 5 | 5 | — | 5 |
| Endurance test vs ADC12 | | | | | | | | | | | | | |
| Wear height (μm) | 33 | 40 | 41 | 29 | 65* | 63 | 49 | 41 | 34* | 43* | 57 | 72 | 96 |
| Wear of mating member (μm) | 4 | 10 | 11 | 12 | 8 | 17 | 3 | 12 | 4 | 11 | 56 | 35 | 81 |
| Endurance test vs S45C | | | | | | | | | | | | | |
| Wear height (μm) | 27 | 45 | 25 | 40 | 43* | 65 | 67 | 27 | 38* | 33* | 46 | 59 | 56 |
| Wear of mating member (μm) | 0 | 0 | 1 | 2 | 0 | 3 | 0 | 4 | 0 | 1 | 3 | 1 | 8 |
| **Break dia. (mm) | 65 | 70 | 60 | 61 | — | 65 | 70 | 47 | — | — | — | — | — |

**Fitting test
*Large variation

TABLE 3

| | | Examples | | | | | | | | | Comparative Examples | | | | |
|---|---|---|---|---|---|---|---|---|---|---|---|---|---|---|---|
| No. | | 1 | 2 | 3 | 4 | 5 | 6 | 7 | 8 | 9 | 1 | 2 | 3 | 4 | 6 | 7 |
| Endurance test (vs ADC12) | | | | | | | | | | | | | | | | |
| Wear of ring (μm) | Side surface | 5 | 4 | 2 | 3 | 6 | 4 | 5 | 2 | 3 | 6 | 8 | 8 | 10 | 25 | 32 |
| | Outer surface | 4 | 1 | 2 | 2 | 4 | 4 | 4 | 3 | 3 | 4 | 9 | 6 | 8 | 24 | 33 |
| Wear of ring groove (μm) | | 2 | 2 | 1 | 2 | 5 | 2 | 3 | 2 | 2 | 4 | 5 | 6 | 6 | 6 | 4 |
| Wear of cylinder (μm) | | 2 | 3 | 2 | 0 | 3 | 3 | 2 | 1 | 2 | 2 | 8 | 4 | 7 | 5 | 6 |
| Endurance test (vs S45C) | | | | | | | | | | | | | | | | |
| Wear of ring (μm) | Side surface | 2 | 2 | 4 | 7 | 5 | 3 | 6 | 6 | 2 | 18 | 32 | 18 | 13 | 38 | 25 |
| | Outer surface | 2 | 3 | 1 | 5 | 4 | 3 | 4 | 5 | 3 | 22 | 26 | 18 | 19 | 41 | 23 |
| Wear of ring groove (μm) | | 5 | 3 | 2 | 1 | 2 | 3 | 6 | 4 | 4 | 6 | 7 | 6 | 11 | 3 | 2 |
| Wear of cylinder (μm) | | 2 | 3 | 0 | 2 | 2 | 1 | 3 | 5 | 5 | 4 | 6 | 4 | 7 | 3 | 1 |

What is claimed is:

1. An oil-submerged sliding member made from a resin composition comprising 30–88% by weight of said resin composition of a cross linked polyallylene sulfide resin, 10–45% by weight of said resin composition of a carbon fiber, and 2–25% by weight of said resin composition of a perfluororesin.

2. An oil submerged sliding member made from a resin composition comprising 30–88% by weight of said resin composition of a crosslinked polyallylene sulfide resin having a melt viscosity of 2000–5000 poise at 300° C., 10–45% by weight of said resin composition of a carbon fiber, and 2–25% by weight of said resin composition of a recycled polytetrafluoroethylene resin powder.

3. An oil-submerged sliding member made from a resin composition comprising 30–88% by weight of said resin composition of a crosslinked polyallylene sulfide resin having a melt viscosity of 2000–5000 poise at 300° C., 10–45% by weight of said resin composition of a carbon fiber, 2–25% by weight of said resin composition of a recycled polytetrafluoroethylene resin powder, and not more than 10% by weight of said resin composition of molybdenum disulfide.

4. An oil-submerged sliding member as claimed in claim 1 wherein said carbon fiber has an average fiber diameter of not less than 10 μm.

5. An oil-submerged sliding member as claimed in claim 1 or 2 wherein said crosslinked polyallylene sulfide resin has a weight-average molecular weight of 20000–45000.

6. An oil seal ring comprising the oil-submerged sliding member as claimed in claim 1.

7. An oil seal ring comprising the oil-submerged sliding member as claimed in claim 2.

8. An oil seal ring comprising the oil-submerged sliding member as claimed in claim 3.

9. An oil submerged sliding member made from a resin composition comprising 30–88% by weight of said resin composition of a crosslinked polyallylene sulfide resin having a melt viscosity of 2000–5000 poise at 300° C., 10–45% by weight of said resin composition of a carbon fiber, and 2–25% by weight of said resin composition of a polytetrafluoroethylene resin powder.

10. An oil-submerged sliding member made from a resin composition comprising 30–88% by weight of said resin composition of a crosslinked polyallylene sulfide resin having a melt viscosity of 2000–5000 poise at 300° C., 10–45% by weight of said resin composition of a carbon fiber, 2–25% by weight of said resin composition of a polytetrafluoroethylene resin powder, and not more than 10% by weight of said resin composition of molybdenum disulfide.

11. A method of making an oil-submerged sliding member comprising the steps of:

preparing a resin composition comprising 30–88% by weight of said resin composition of a cross linked polyallylene sulfide resin, 10–45% by weight of said resin composition of a carbon fiber, and 2–25% by weight of said resin composition of a perfluororesin; and forming said oil submerged sliding member from said resin composition.

12. A method of making an oil submerged sliding member comprising the steps of:

preparing a resin composition comprising 30–88% by weight of said resin composition of a crosslinked polyallylene sulfide resin having a melt viscosity of 2000–5000 poise at 300° C., 10–45% by weight of said resin composition of a carbon fiber, and 2–25% by weight of said resin composition of a polytetrafluoroethylene resin powder; and forming said oil submerged sliding member from said resin composition.

13. A method of making an oil-submerged sliding member comprising the steps of:

preparing a resin composition comprising 30–88% by weight of said resin composition of a crosslinked polyallylene sulfide resin having a melt viscosity of 2000–5000 poise at 300° C., 10–45% by weight of said resin composition of a carbon fiber, 2–25% by weight of said resin composition of a recycled polytetrafluoroethylene resin powder, and not more than 10% by weight of said resin composition of molybdenum disulfide; and forming said oil submerged sliding member from said resin composition.

* * * * *